United States Patent
Iwasaki

(10) Patent No.: US 9,665,334 B2
(45) Date of Patent: May 30, 2017

(54) RENDERING SYSTEM, RENDERING SERVER, CONTROL METHOD THEREOF, PROGRAM, AND RECORDING MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 397 days.

(21) Appl. No.: 14/356,225

(22) PCT Filed: Oct. 5, 2012

(86) PCT No.: PCT/JP2012/076560
§ 371 (c)(1),
(2) Date: May 5, 2014

(87) PCT Pub. No.: WO2013/069409
PCT Pub. Date: May 16, 2013

(65) Prior Publication Data
US 2014/0285499 A1    Sep. 25, 2014

Related U.S. Application Data

(60) Provisional application No. 61/556,544, filed on Nov. 7, 2011.

(30) Foreign Application Priority Data

Dec. 16, 2011    (JP) .................................. 2011-276107

(51) Int. Cl.
*G06T 15/00*      (2011.01)
*G06T 1/20*       (2006.01)
(Continued)

(52) U.S. Cl.
CPC .............. *G06F 3/1438* (2013.01); *G06T 1/20* (2013.01); *G06T 11/60* (2013.01); *G06T 15/005* (2013.01);
(Continued)

(58) Field of Classification Search
None
See application file for complete search history.

(56) References Cited

U.S. PATENT DOCUMENTS 5,261,030 A  *  11/1993  Brooke ................ G06T 11/203
                                                    345/639
5,572,636 A     11/1996  Sakuraba et al.
(Continued)

FOREIGN PATENT DOCUMENTS

CN    101118645 A    2/2008
EP    1304648 A2     4/2003
(Continued)

OTHER PUBLICATIONS

Search report from PCT/JP2012/076560, mail date is Nov. 13, 2012.
(Continued)

*Primary Examiner* — Joni Richer
(74) *Attorney, Agent, or Firm* — Greenblum & Bernstein, P.L.C.

(57) ABSTRACT

One device generates a first screen by executing some processes including a first process of rendering processing of the screen to be displayed in accordance with the information required to determine the rendered contents. On the other hand, devices except for the one device generates a second screen by executing some processes, which do not include the first process but include a second process different from the first process, of the rendering processing of the screen to be displayed in accordance with that information, and sends the second screen to the one device. Then,
(Continued)

the one device receives the second screens generated by the respective devices except for the one device, and generates the screen to be displayed by compositing the first and second screens.

15 Claims, 8 Drawing Sheets

(51) Int. Cl.
*G06F 3/14* (2006.01)
*G06T 11/60* (2006.01)
*G09G 5/36* (2006.01)

(52) U.S. Cl.
CPC ........ *G09G 5/363* (2013.01); *A63F 2300/538* (2013.01); *A63F 2300/66* (2013.01); *G06T 2200/16* (2013.01); *G06T 2210/52* (2013.01); *G09G 2320/0252* (2013.01); *G09G 2360/08* (2013.01); *G09G 2360/126* (2013.01); *G09G 2370/022* (2013.01)

(56) References Cited

U.S. PATENT DOCUMENTS

| | | | |
|---|---|---|---|
| 5,586,234 A | 12/1996 | Sakuraba et al. | |
| 5,850,224 A | 12/1998 | Sakuraba | |
| 5,940,091 A | 8/1999 | Nakamura | |
| 6,052,126 A | 4/2000 | Sakuraba et al. | |
| 6,226,017 B1* | 5/2001 | Goossen | G06T 1/60 345/531 |
| 6,307,567 B1* | 10/2001 | Cohen-Or | G06T 15/10 345/473 |
| 7,015,908 B2 | 3/2006 | Nakagawa et al. | |
| 7,176,920 B1 | 2/2007 | Billyard et al. | |
| 9,270,783 B2* | 2/2016 | Madruga | H04L 67/36 |
| 2002/0080141 A1 | 6/2002 | Imai et al. | |
| 2002/0135603 A1 | 9/2002 | Nakagawa et al. | |
| 2004/0189669 A1 | 9/2004 | David et al. | |
| 2006/0214949 A1 | 9/2006 | Zhang | |
| 2007/0079244 A1 | 4/2007 | Brugiolo | |
| 2008/0030510 A1 | 2/2008 | Wan et al. | |
| 2009/0210487 A1* | 8/2009 | Westerhoff | G06T 15/005 709/203 |
| 2011/0043523 A1* | 2/2011 | Kim | G06T 15/005 345/426 |
| 2011/0157197 A1 | 6/2011 | Clemie et al. | |
| 2012/0243790 A1* | 9/2012 | Campbell | G01B 11/028 382/199 |
| 2012/0280991 A1* | 11/2012 | Maloney | G06T 13/80 345/420 |

FOREIGN PATENT DOCUMENTS

| | | |
|---|---|---|
| EP | 1 483 741 | 12/2004 |
| EP | 1 934 808 | 6/2008 |
| JP | 06-083977 | 3/1994 |
| JP | 06-214555 | 8/1994 |
| JP | 2000-126463 | 5/2000 |
| JP | 2002-109564 | 4/2002 |
| JP | 2002-216151 | 8/2002 |
| JP | 2005-519382 | 6/2005 |
| JP | 2005-284403 | 10/2005 |
| JP | 2006-107337 | 4/2006 |
| JP | 2006-252291 | 9/2006 |
| JP | 2009-508249 | 2/2009 |
| JP | 4409956 B2 | 11/2009 |
| WO | 03/075116 | 9/2003 |
| WO | 2007/032846 | 3/2007 |
| WO | 2009/138878 | 11/2009 |

OTHER PUBLICATIONS

Office Action issued in Chinese Family member Patent Appl. No. 201280054305.X, dated Dec. 1, 2015 , along with an English translation thereof.

Search Report issued by E.P.O. patent office in E.P.O. Patent Application No. 12848674.3, dated Nov. 20, 2015.

Office Action issued in Canada Family member Patent Appl. No. 2853212, dated Nov. 4, 2015.

* cited by examiner

RENDERING SYSTEM, RENDERING SERVER, CONTROL METHOD THEREOF, PROGRAM, AND RECORDING MEDIUM

CLAIM FOR PRIORITY

This application is a U.S. National Stage of PCT/JP2012/076560 Oct. 5, 2012, and claims the priority benefit of U.S. provisional application 61/556,544, filed Nov. 7, 2011, and Japanese application 2011-276107 filed on Dec. 16, 2011, the contents of which is expressly incorporated by reference herein in its entirety.

This application claims the benefits of U.S. Patent Provisional Application No. 61/556,544, filed Nov. 7, 2011, and Japanese Patent Application No. 2011-276107, filed Dec. 16, 2011, which are hereby incorporated by reference herein in their entirety.

TECHNICAL FIELD

The present invention relates to a rendering system, rendering server, control method thereof, program, and recording medium, and particularly to a technique for generating one screen by sharing rendering processing by a plurality of devices connected via a network.

BACKGROUND ART

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multiplayer Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device executes rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to execute rendering processing require a user to use a PC having sufficient rendering performance or a dedicated game machine. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in International Publication No. 2009/138878, a server acquires the information of an operation caused in a client device and provides, to the client device, a game screen obtained by executing rendering processing using the information.

In the game described above in International Publication No. 2009/138878, the server renders and transfers the game screen to be provided to the client device. That is, the client device receives and plays back the game screen generated by the rendering processing executed by the server, thus displaying the game screen. However, a practical method of sharing the rendering processing by a plurality of devices has not been disclosed yet.

SUMMARY OF INVENTION

The present invention has been made in consideration of the aforementioned conventional problems. The present invention provides a rendering system, rendering server, control method thereof, program, and recording medium, which allow a plurality of devices to share and efficiently execute rendering processing for one screen.

The present invention in its first aspect provides a rendering system for allowing a plurality of devices to share and execute rendering processing of a screen to be displayed on display means, one device of the plurality of devices comprising: sending means for sending information required to determine rendered contents of the screen to be displayed to respective devices except for the one device of the plurality of devices; first rendering means for generating a first screen by executing some processes including a first process of the rendering processing of the screen to be displayed according to the information required to determine the rendered contents; screen receiving means for receiving second screens which are generated by the respective devices except for the one device and correspond to the rendered contents; and composition means for generating the screen to be displayed by compositing the first screen generated by the first rendering means and the second screens received by the screen receiving means, and each of the devices, except for the one device, comprising: receiving means for receiving the information required to determine the rendered contents from the one device; second rendering means for generating the second screen by executing some processes, which do not include the first process but include a second process different from the first process, of the rendering processing of the screen to be displayed according to the information required to determine the rendered contents, which the receiving means received; and screen sending means for sending the second screen generated by the second rendering means to the one device.

The present invention in its second aspect provides a rendering system, which allows a first device and a second device to share and execute rendering processing of a screen to be displayed on display means, the first device comprising: receiving means for receiving information required to determine rendered contents of the screen to be displayed from the second device; first rendering means for generating a first screen by executing some processes including a first process of the rendering processing of the screen to be displayed according to the information required to determine the rendered contents, which the receiving means received; screen receiving means for receiving a second screen which is generated by the second device and corresponds to the rendered contents; and composition means for generating the screen to be displayed by compositing the first screen generated by the first rendering means and the second screen received by the screen receiving means, and the second device comprising: sending means for sending information required to determine the rendered contents to the first device; second rendering means for generating the second screen by executing some processes, which do not include the first process but include a second process different from the first process, of the rendering processing of the screen to be displayed according to the information required to determine the rendered contents; and screen sending means for sending the second screen generated by the second rendering means to the first device.

The present invention in its third aspect provides a rendering server, which handles some processes of rendering processing of a screen to be displayed on display means connected to a client device, the server comprising: rendering means for generating a screen to be provided by executing some processes including a predetermined process of the rendering processing of the screen to be displayed in accordance with information required to determine rendered contents of the screen to be displayed; and sending means for sending the screen to be provided generated by the rendering means to the client device.

Further features of the present invention will become apparent from the following description of exemplary embodiments (with reference to the attached drawings).

DESCRIPTION OF EMBODIMENTS

First Embodiment

Exemplary embodiments of the present invention will be described in detail hereinafter with reference to the drawings. Note that one embodiment to be described hereinafter will explain an example in which the present invention is applied to a rendering server 200, as an example of a rendering system, which provides, to a PC 100, a screen for which some predetermined processes of rendering processing of a screen related to a game program executed in the PC 100 are executed. However, the present invention is applicable to an arbitrary device and system, which can execute rendering processing related to one screen by sharing that processing by a plurality of devices.

<Configuration of Rendering System>

Figure 1:
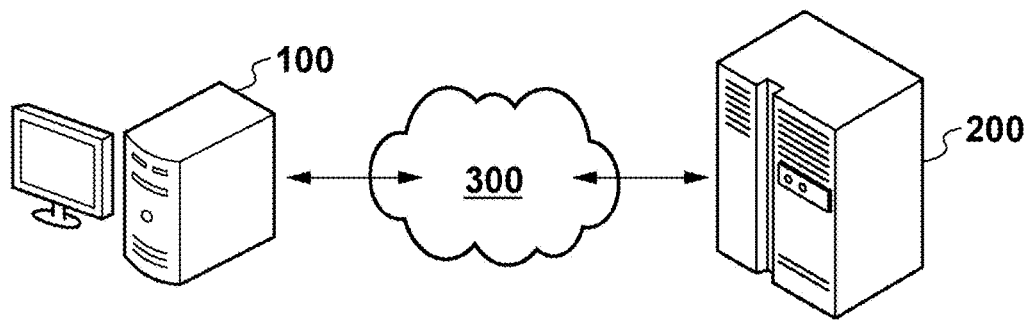
FIG. 1 is a view showing the system configuration of a rendering system according to an embodiment of the present invention.

FIG. 1 is a view showing the system configuration of a rendering system according to an embodiment of the present invention.

As shown in FIG. 1, a PC 100 and rendering server 200 are connected via a network 300 such as the Internet. In this embodiment, the PC 100 and rendering server 200 share and execute rendering processing of a screen (game screen) related to a game program to be executed in the PC 100.

More specifically, for one screen, the PC 100 generates a first screen using texture mapping (texturing processing) and basic illumination models without applying global illumination to rendering objects included in the screen. Upon reception of information required to determine the rendered contents of the screen from the PC 100 via the network 300, the rendering server 200 generates a second screen by applying the global illumination without applying any texturing processing to the rendering objects. The rendering server 200 sends the generated second screen to the PC 100 via the network 300, and the PC 100 generates a game screen to be displayed by compositing the received second screen and the generated first screen. Then, the PC 100 outputs the screen to be displayed to a connected display device.

As described above, in the rendering system of this embodiment, the two devices (PC 100 and rendering server 200) share the rendering processing of one screen, and generate a screen for which all processes related to the rendering processing are finally executed by independently generating screens in association with the shared processes and compositing the generated screens.

Note that the global illumination is a rendering algorithm which physically accurately reproduces behaviors and the like such as indirect reflection and diffusion of light depending on materials. The global illumination is suited to rendering of a real graphic image. Processing related to the global illumination is speeded up by various algorithms. However, the global illumination generally requires a large calculation volume, and also requires hardware performance to complete those calculations within a given time when a predetermined update frame rate is required like in a game. That is, for example, in order to apply the global illumination in a computer, which executes a program related to a content such as a game, very high rendering performance or calculation performance is required for the computer, thus limiting content users.

This embodiment will explain the PC 100 as a client device connected to the rendering server 200, but the present invention is not limited to such specific embodiment. For example, a client device connected to the rendering server 200 may be a device which has enough rendering performance to render the first screen, such as a home game machine, portable game machine, mobile phone, PDA, or tablet.

<Arrangement of PC 100>

Figure 2:
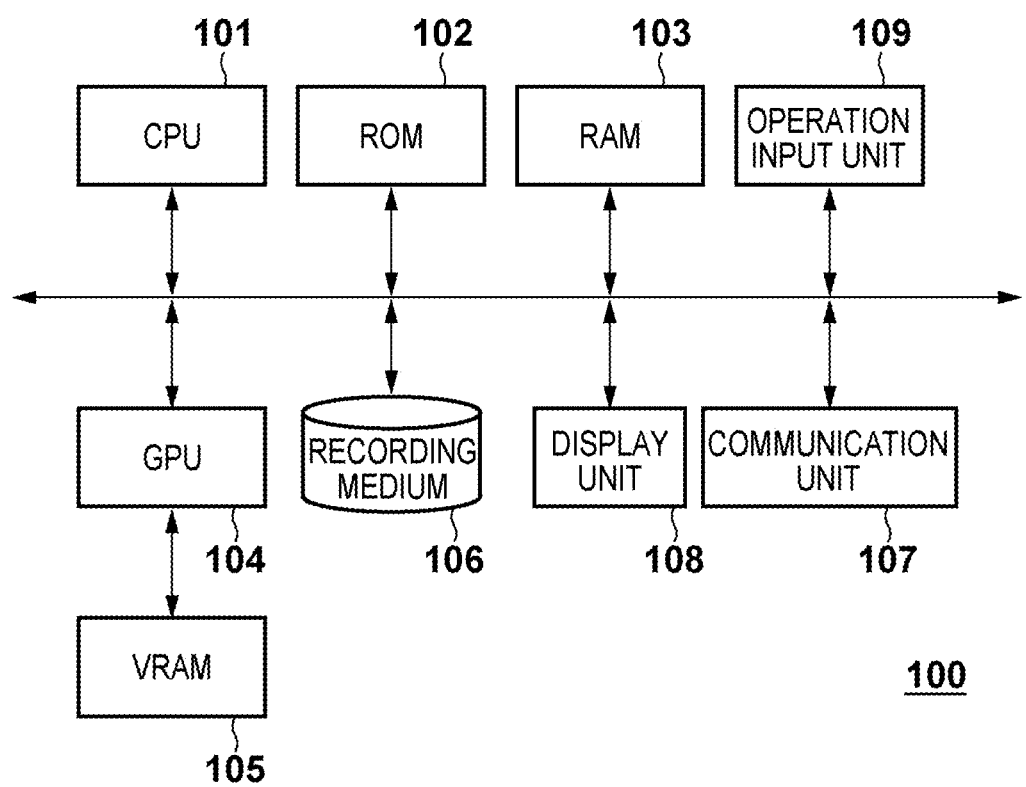
FIG. 2 is a block diagram showing the functional arrangement of a PC 100 according to the embodiment of the present invention.

FIG. 2 is a block diagram showing the functional arrangement of the PC 100 according to the embodiment of the present invention.

A CPU 101 controls operations of respective blocks included in the PC 100. More specifically, the CPU 101 controls the operations of the respective blocks by reading out operation programs of game processing and client-side rendering processing, which are recorded in, for example, a ROM 102 or recording medium 106, extracting the readout programs onto the RAM 103, and executing the extracted programs.

The ROM 102 is, for example, a rewritable nonvolatile memory. The ROM 102 stores information such as constants required for the operations of the respective blocks included in the PC 100 in addition to the operation programs of the game processing and the like.

The RAM 103 is a volatile memory. The RAM 103 is used not only as an extraction area of the operation programs, but also as a storage area required to temporarily store intermediate data and the like, which are output during the operations of the respective blocks included in the PC 100.

A GPU 104 generates a game screen to be displayed on a display unit 108 (to be described later). To the GPU 104, a video memory (VRAM) 105 as a rendering area of the game screen is connected. Also, the GPU 104 has a GPU memory (not shown). Upon reception of a rendering instruction from the CPU 101, the GPU 104 receives a rendering object related to that rendering instruction, and stores it in the GPU memory. Then, the GPU 104 renders the rendering object on the connected VRAM 105 according to the rendering instruction. In this embodiment, the GPU 104 generates the first screen using texturing processing and basic illumination models as processes included in the rendering processing without applying the global illumination.

The recording medium 106 is, for example, a recording device such as an HDD or SSD removably connected to the PC 100. In this embodiment, assume that the recording medium 106 records model data (or vertex data and wire connection data), texture data, setting parameters, and the like, which are related to rendering objects rendered on the game screen, in addition to the operation programs of the game processing, and the like.

A communication unit 107 is a communication interface included in the PC 100. The communication unit 107 exchanges data with another device such as the rendering server 200 connected via the network 300. Upon sending of data, the communication unit 107 converts the data into a data transmission format determined between itself and the network 300 or a destination device, and sends the data to the destination device. Also, upon reception of data, the communication unit 107 converts data received via the network 300 into an arbitrary data format that can be read by the PC 100, and stores the converted data in, for example, the RAM 103.

Note that the following description of this embodiment will be given under the assumption that the PC 100 and rendering server 200 are connected via the network 300. For example, it could be easily understood that the PC 100 and rendering server 200 may be directly connected using a cable. Alternatively, the PC 100 and rendering server 200 may be connected via another device.

The display unit 108 is, for example, a display device such as an LCD monitor connected to the PC 100. The display unit 108 executes display control to display the input game screen on a display area. Note that the display unit 108 may be a display device built in the PC 100 like a laptop PC, or that which is externally connected to the PC 100 using a cable.

An operation input unit 109 is, for example, a user interface such as a mouse, keyboard, and game pad included in the PC 100. When the operation input unit 109 detects that the user causes an operation on the user interface, it outputs a control signal corresponding to that operation to the CPU 101.

<Arrangement of Rendering Server 200>

Figure 3:
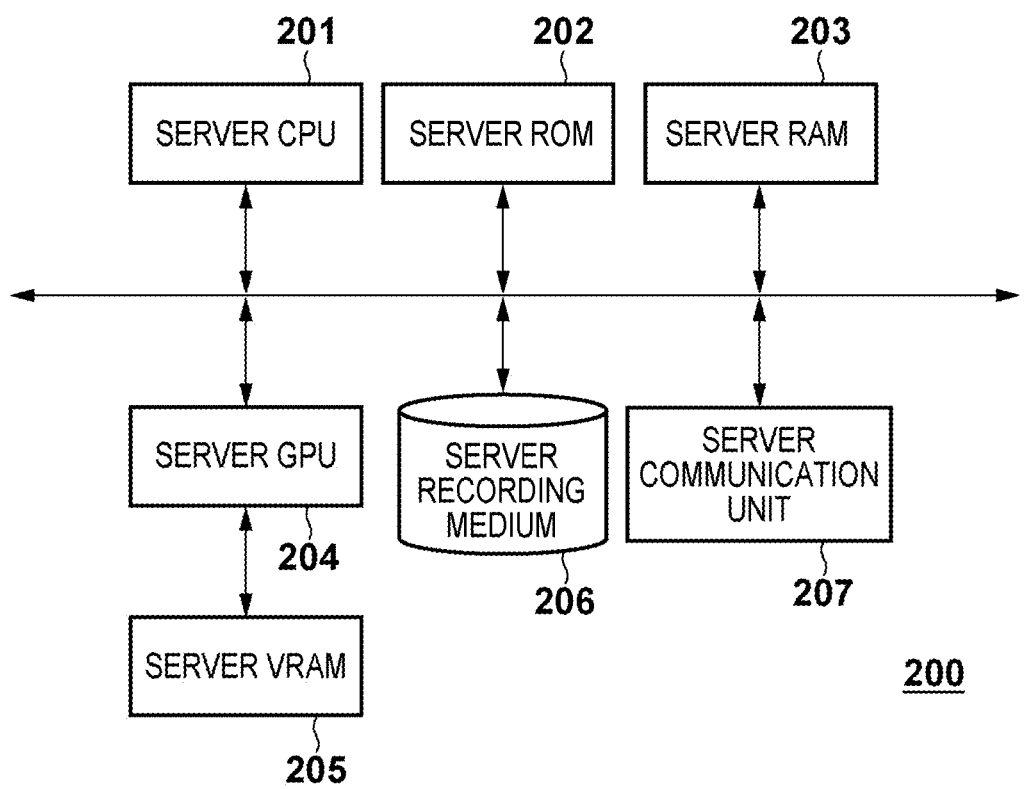
FIG. 3 is a block diagram showing the functional arrangement of a rendering server 200 according to the embodiment of the present invention.

FIG. 3 is a block diagram showing the functional arrangement of the rendering server 200 according to the embodiment of the present invention.

A server CPU 201 controls operations of respective blocks included in the rendering server 200. More specifically, the server CPU 201 controls the operations of the respective blocks by reading out an operation program of server-side rendering processing stored in, for example, a server ROM 202 or server recording medium 206, extracting the readout program onto a server RAM 203, and executing the extracted program.

The server ROM 202 is, for example, a rewritable nonvolatile memory. The server ROM 202 stores information such as constants required for the operations of the respective blocks included in the rendering server 200 in addition to the operation program of the server-side rendering processing and the like.

The server RAM 203 is a volatile memory. The server RAM 203 is used not only as an extraction area of the operation program but also as a storage area required to temporarily store intermediate data and the like, which are output during the operations of the respective blocks included in the rendering server 200.

A server GPU 204 generates a screen (second screen) to which some predetermined processes excluding the texturing processing of the rendering processing are applied in association with the game screen to be displayed on the display unit 108 of the PC 100. To the server GPU 204, a server VRAM 205 is connected. Upon reception of a rendering instruction from the server CPU 201, the server GPU 204 receives a rendering object related to the rendering instruction, and stores it in a GPU memory. When the server GPU 204 executes rendering on the connected server VRAM 205, it extracts the rendering object onto a cache memory, and writes the extracted rendering object in the server VRAM 205.

In this embodiment, the server GPU 204 handles processing for applying the global illumination, as some predetermined processes of the rendering processing for the game screen. The server GPU 204 generates the screen according to received information, which is required to determine the rendered contents of the game screen, of a position and direction of a camera (viewpoint) corresponding to the game screen. At this time, the server GPU 204 generates, on the server VRAM 205, the second screen by applying the global illumination to rendering objects included in the game screen without applying the texturing processing.

The server recording medium 206 is, for example, a recording device such as an HDD, which is removably connected to the rendering server 200. In this embodiment, assume that the server recording medium 206 records model data, light source information, and the like, which are used to generate the screen in the rendering processing. Note that the model data recorded in the server recording medium 206 are the same as those recorded in the recording medium 106 of the PC 100.

In this embodiment, the rendering server 200 receives, from the PC 100, information indicating the position and direction of the camera corresponding to the game screen as the information required to determine the rendered contents, as described above. That is, the server GPU 204 has to specify rendering objects included in the game screen based on the information of the position and direction of the camera. For this purpose, the server recording medium 206 records a processing program which specifies the same rendering objects as those of the game processing in the PC 100 as rendering objects included in the game screen. This processing program may be the same as that of the game processing, or may be a program which specifies rendering objects included in the game screen and parameters of their position/rotation information, and the like based on the information of the position and direction of the camera although it is different from the program of the game processing.

A server communication unit 207 is a communication interface included in the rendering server 200. In this embodiment, the server communication unit 207 exchanges data with another device such as the PC 100 connected via the network 300. Note that the server communication unit 207 executes conversion of data formats according to the communication specifications as in the communication unit 107.

<Game Processing>

Figure 4:
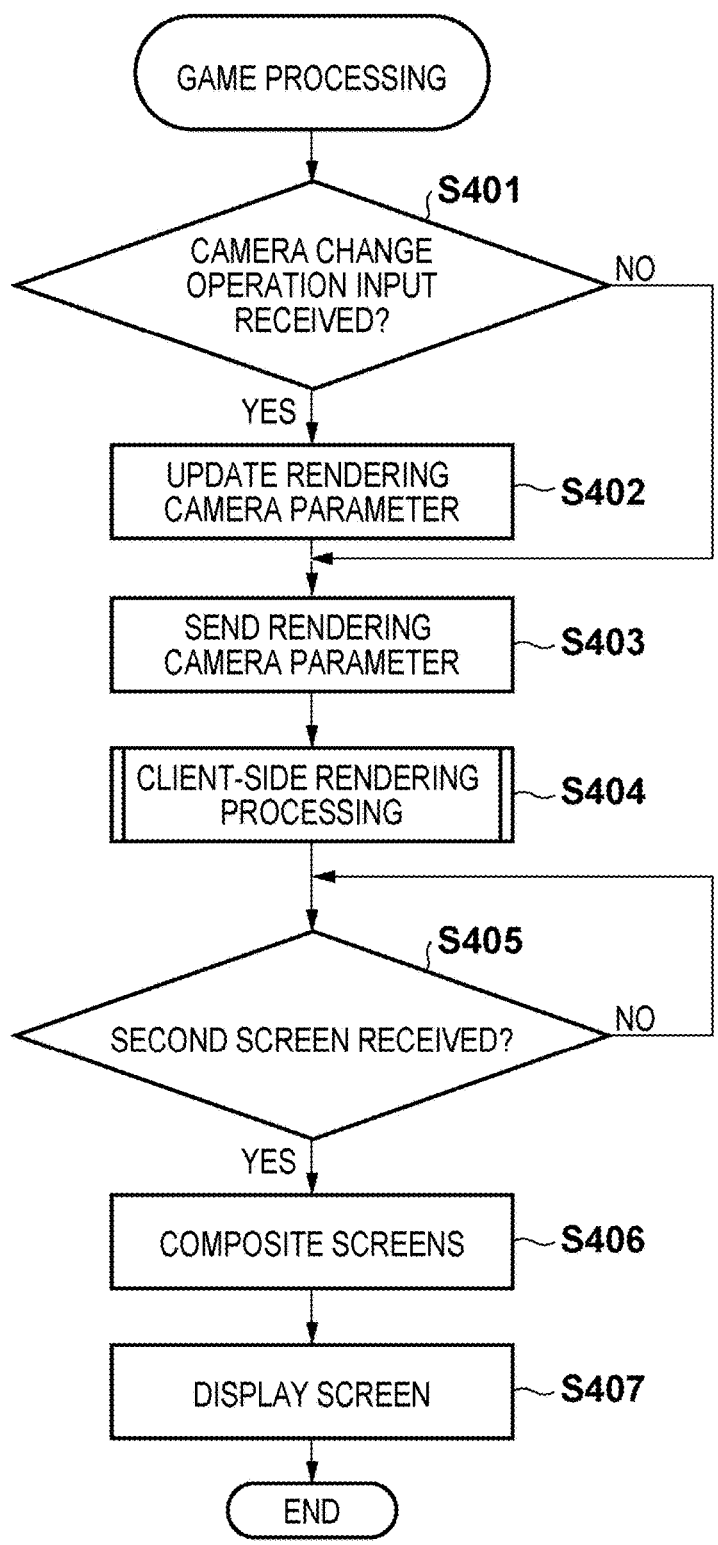
FIG. 4 is a flowchart exemplifying game processing according to the first embodiment of the present invention.

Basic game processing, which is executed in the PC 100 of the rendering system of this embodiment having the aforementioned arrangement, will be practically described below with reference to the flowchart shown in FIG. 4. The processing corresponding to this flowchart can be implemented when the CPU 101 reads out a corresponding processing program recorded in, for example, the recording medium 106, extracts the readout program onto the RAM 103, and executes the extracted program. Note that the following description will be given under the assumption that this game processing is started when, for example, the user inputs an execution instruction of an application corresponding to the game processing in the PC 100, and is repetitively executed for one frame of a game.

Assume that in this embodiment, a game content executed in the PC 100 is a game such as a so-called FPS (First Person Shooter) for which a first-person viewpoint of a character to be operated is provided as a game screen, for the sake of simplicity. Also, assume that motions and actions of rendering objects such as characters included in the game screen are not generated or can be defined according to uniquely determined variables such as a time. That is, the game content executed in the PC 100 of this embodiment can specify rendering objects included in the game screen by only the information indicating the position and direction of the camera corresponding to the game screen. That is, the game screen specified by the game processing of the PC 100 can specify the same screen on the rendering server 200 using only the information indicating the position and direction of the camera.

However, an embodiment of the present invention is not limited to that which provides such game screen of the first-person viewpoint of the FPS game or the like, and the present invention is applicable to other contents which provide screens obtained by rendering processing. For example, when motions and actions of rendering objects included in a game screen are generated in the screen in response to an operation input from the user or a random event, parameters which define the motions and actions of the rendering objects in a frame need only be sent to the rendering server 200 as information required to determine the rendered contents in addition to the position and direction of the camera. Alternatively, the operation input from the user may be directly sent to the rendering server 200.

The CPU 101 determines in step S401 whether or not an operation input for changing the position and direction of the camera, which specify the game screen, is made by the user. More specifically, the CPU 101 determines whether or not the operation input is made by seeing whether or not a control signal corresponding to the operation input for changing the position and direction of the camera is received from the operation input unit 109. If the CPU 101 judges that the operation input for the game is made, the process advances to step S402; otherwise, the process advances to step S403.

In step S402, the CPU 101 updates the information (rendering camera parameters) indicating the position and direction of the camera, which information is stored in, for example, the RAM 103, in accordance with the operation input for changing the position and direction of the camera.

In step S403, the CPU 101 sends rendering camera parameters stored in the RAM 103 to the rendering server 200 as information required to determine the rendered contents. More specifically, the CPU 101 reads out the rendering camera parameters from the RAM 103, transfers the readout parameters to the communication unit 107, and controls the communication unit 107 to send the parameters to the rendering server 200.

In step S404, the CPU 101 executes client-side rendering processing for rendering the first screen related to the game screen according to the rendering camera parameters stored in the RAM 103.

(Client-Side Rendering Processing)

Figure 5:
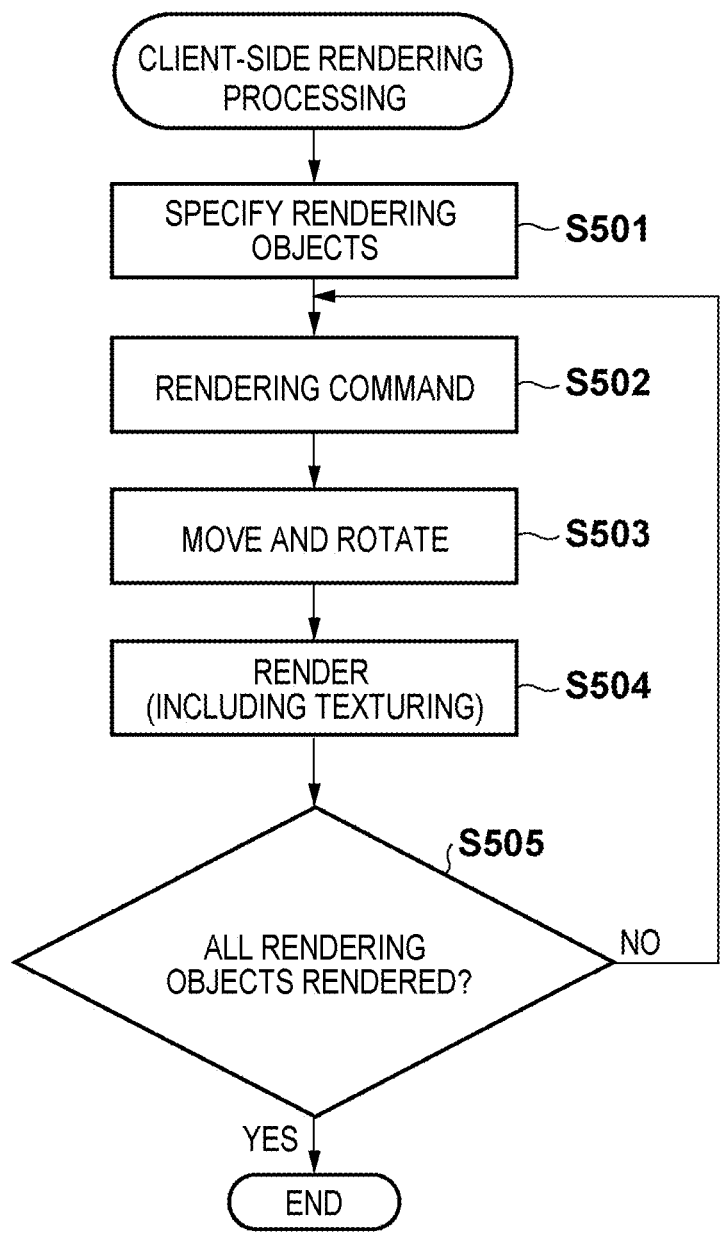
FIG. 5 is a flowchart exemplifying client-side rendering processing according to the first embodiment of the present invention.

The client-side rendering processing executed in the PC 100 of this embodiment will be practically explained below with reference to the flowchart shown in FIG. 5.

In step S501, the CPU 101 specifies rendering objects included in the game screen to be rendered. More specifically, the CPU 101 reads out the rendering camera parameters from the RAM 103, and calculates information of a rendering range on a world specified by the rendering camera parameters. Then, the CPU 101 specifies rendering objects included in the rendering range based on, for example, information of layout positions of the rendering objects distributed in the world.

In step S502, the CPU 101 selects a rendering object to be rendered according to a rendering order determined by a predetermined rendering order determination method. The CPU 101 then transfers a rendering instruction of the selected rendering object to the GPU 104. Also, the CPU 101 reads out model data (or vertex data and wire connection data) and texture data of the rendering object, and parameters of position/rotation information parameters associated with that rendering object from the recording medium 106, and transfers them to the GPU 104. Assume that the rendering object selected in this step includes a background object. The GPU 104 stores the transferred information associated with the rendering object in the GPU memory.

In step S503, the GPU 104 moves and rotates the model data stored in the GPU memory in accordance with the parameters of the position/rotation information associated with the selected rendering object under the control of the CPU 101. More specifically, the GPU 104 defines spatial coordinates corresponding to the parameters of the position/rotation information for respective vertices of the selected rendering object.

In step S504, under the control of the CPU 101, the GPU 104 applies texture mapping (texturing processing) using the texture data stored in the GPU memory to respective polygons of the model data which is moved and rotated in step S503, and renders the object on a frame buffer of the VRAM 105. Note that illuminating calculations of reflections and the like are not executed for each of rendering objects to be rendered in this client-side rendering processing, and respective vertices are rendered so that their brightness values are defined using a predetermined fixed value or the like.

The CPU 101 determines in step S505 whether or not rendering of all the rendering objects included in the rendering range onto the VRAM 105 by the GPU 104 is complete. If the CPU 101 judges that rendering of all the rendering objects onto the VRAM 105 is complete, this client-side rendering processing ends; otherwise, the process returns to step S502.

Figure 8A:
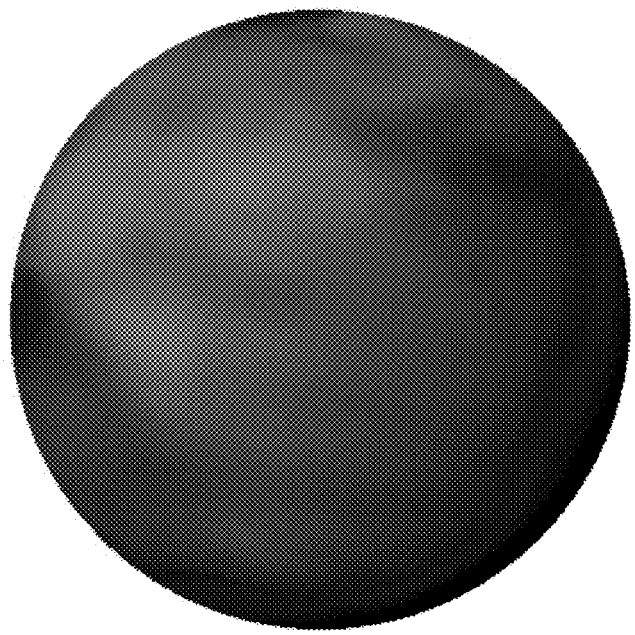
FIGS. 8A and 8B are views exemplifying first and second screens according to the embodiment of the present invention.

Since the client-side rendering processing is executed in this way, the first screen generated using the texturing processing and basic illumination models can be obtained without applying the global illumination. For example, when a sphere model is to be rendered, the first screen is obtained, as shown in FIG. 8A. In the example of FIG. 8A, the sphere model is self-illuminated (to have a uniform luminance level for each plane), and has undergone the texturing processing.

The CPU 101 determines in step S405 whether or not the second screen, which is generated by applying the global illumination without applying the texturing processing related to the game screen, is received. More specifically, the CPU 101 determines whether or not the communication unit 107 receives the second screen from the rendering server 200 via the network 300. If the CPU 101 judges that the second screen is received, the process advances to step S406; otherwise, the process of this step is repeated.

Note that the following description of this embodiment will be given under the assumption that generation of the first and second screens is executed within one frame. However, the present invention is not limited to such specific embodiment. For example, when generation of the second frame is not complete within one frame, the second screen may include frame identification information required to identify a rendering frame so as to discriminate whether or not the first screen obtained by the client-side rendering processing executed in step S404 and the second screen received in this step are rendered for the game screen of the same frame. In this case, the CPU 101 sends information which is required to determine the rendered contents in step S403 and includes the frame identification information. When the rendering server 200 generates the second screen and sends it to the PC 100, the server CPU 201 associates the frame identification information with that second screen. More specifically, the CPU 101 can discriminate with reference to the frame identification information associated with the screen received by the communication unit 107 whether or not the received screen is rendered for the game screen of the identical frame.

In step S406, the CPU 101 generates a final game screen to be displayed on the display unit 108 on, for example, the VRAM 105 by compositing the received second screen and the first screen. More specifically, the first and second screens are formed of, for example, images of R, G, and B components, and images of respective colors associated with the final game screen are generated by compositing pixels at identical pixel positions of the images of the respective colors. Note that a pixel value of each pixel assumes a normalized value, and pixel composition may be executed by, for example, multiplying pixel values.

In step S407, the CPU 101 transfers the final game screen generated in step S406 to the display unit 108, so as to display it on the display screen.

<Server-Side Rendering Processing>

Figure 6:
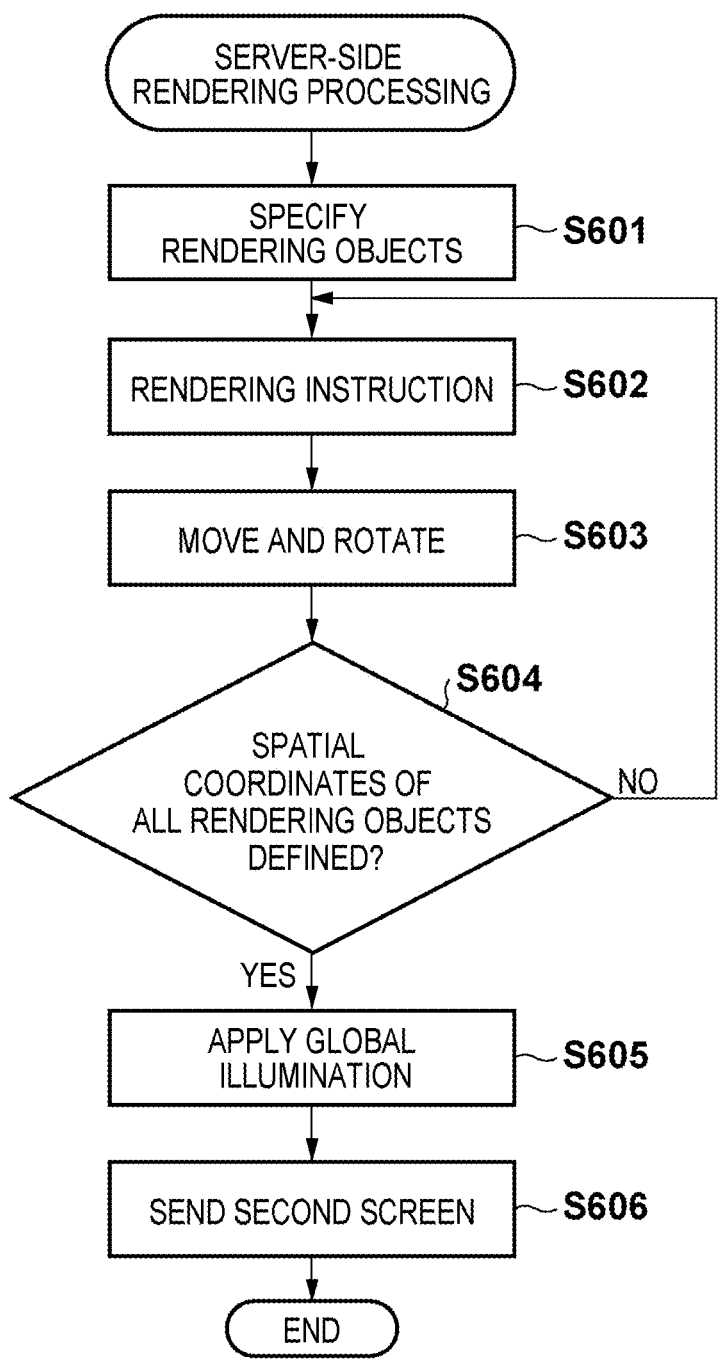
FIG. 6 is a flowchart exemplifying server-side rendering processing according to the first embodiment of the present invention.

The server-side rendering processing, which is executed in the rendering server 200, for rendering the second screen related to the game screen will be practically described below with reference to the flowchart shown in FIG. 6. The processing corresponding to this flowchart can be implemented when the server CPU 201 reads out a corresponding processing program recorded in, for example, the server recording medium 206, extracts the readout program onto the server RAM 203, and executes the extracted program.

Note that the following description will be given under the assumption that this server-side rendering processing is started when, for example, the server CPU 201 detects that the server communication unit 207 receives the rendering camera parameters as information required to determine the rendered contents of the game screen. Also, the following description will be given under the assumption that the server CPU 201 stores the rendering camera parameters received by the server communication unit 207 in the server RAM 203.

In step S601, the server CPU 201 specifies rendering objects included in a game screen to be rendered. More specifically, the server CPU 201 reads out the rendering camera parameters from the server RAM 203, and calculates information of a rendering range on a world specified by the rendering camera parameters. Then, the server CPU 201 specifies rendering objects included in the rendering range based on information of layout positions of the rendering objects distributed in the world as in the PC 100.

In step S602, the server CPU 201 selects a rendering object to be rendered in accordance with a rendering order determined by a predetermined rendering order determination method. Then, the server CPU 201 transfers a rendering instruction related to the rendering object to the server GPU 204. Also, the server CPU 201 reads out model data and parameters of position/rotation information associated with the rendering object from the server recording medium 206, and transfers them to the server GPU 204. The server GPU 204 stores the transferred information related to the rendering object in the GPU memory.

In step S603, the server GPU 204 moves and rotates the model data stored in the GPU memory according to the parameters of the position/rotation information related to the selected rendering object under the control of the server CPU 201, thus defining spatial coordinates.

The server CPU 201 determines in step S604 whether or not definitions of spatial coordinates for all the rendering objects included in the rendering range are complete. If the server CPU 201 judges that definitions of spatial coordinates of all the rendering objects are complete, the process advances to step S605; otherwise, the process returns to step S602.

Figure 8B:
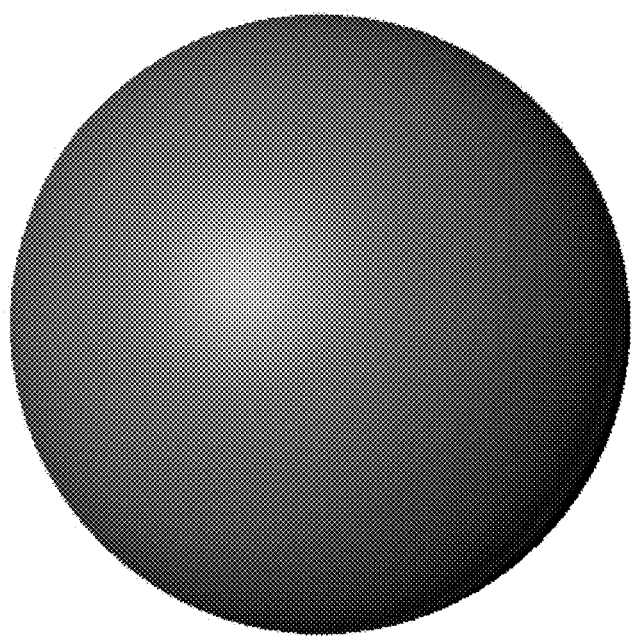

In step S605, the server GPU 204 executes processing for applying the global illumination under the control of the server CPU 201. The server CPU 201 reads out information indicating positions, directions, and types of light sources to be applied to the rendering range or its surrounding portion (light source information) from the server recording medium 206, and transfers the readout information to the server GPU 204. Upon reception of the light source information, the server CPU 204 executes calculation processing (for example, photon mapping, radiosity, or the like) related to the global illumination based on the light source information for the rendering objects whose spatial coordinates are defined. Then, the server GPU 204 renders the second screen to which the global illumination is applied on the server VRAM 205. For example, when a sphere model is to be rendered, the second screen is obtained, as shown in FIG. 8B. In the example of FIG. 8B, illuminating calculations, which consider a Specular map in association with a direction light, are applied to the sphere model although no texture is applied. Note that FIG. 8B shows a very simple example, and it could be easily understood that the applied contents of the global illumination are not limited to this example.

In step S606, the server CPU 201 acquires the second screen rendered by the server GPU 204, transfers that screen to the server communication unit 207, and controls the server communication unit 207 to send it to the PC 100. Note that in the arrangement in which the game screen is provided as continuous moving image data like in this embodiment, a format of the second screen to be sent from the rendering server 200 to the PC 100 is not limited to an image data format. More specifically, in consideration of the screen to be continuously sent, the server CPU 201 may send encoded moving image data obtained by executing encoding processing including inter-frame prediction with reference to previous and next frames or the like in association with the generated second screen to the PC 100.

As described above, the rendering system of this embodiment can share the rendering processing of the game screen to generate the first screen to which the texturing processing is applied and the second screen to which the global illumination is applied. That is, the global illumination which requires high calculation performance in the rendering processing is assigned to the rendering server which can be designed to have enough calculation resources, thus providing a high-quality game screen independently of the rendering performance of the client device.

Note that this embodiment has been explained under the condition that the PC 100 as a client device and the rendering server 200 are connected via communications. For example, when a communication is disconnected, the first screen may be provided while skipping composition processing. Alternatively, depending on whether or not the PC 100 and rendering server 200 are connected via communications, the rendering processing of the first screen to be rendered in the PC 100 may be switched. More specifically, when the PC 100 cannot communicate with the rendering server 200, a game screen is rendered and provided by executing illuminating calculations according to the rendering performance of the PC 100. On the other hand, when the PC 100 can communicate with the rendering server 200, the PC 100 does not execute any illuminating calculations, and composites the first screen to the second screen to which the global illumination is applied, thus providing a high-quality game screen with high light source reproducibility.

In this case, for example, the PC 100 may notify the user that the quality of the game screen is enhanced using an image obtained by sharing the rendering processing with the rendering server 200 on the network by displaying such message on the display unit 108. Conversely, the PC 100 may notify the user that a communication with the rendering server 200 on the network is disabled to skip the quality enhancement of the game screen, and the game screen obtained by executing the rendering processing by only the PC 100 is displayed by displaying such message on the display unit 108.

Whether or not to provide a game screen to which the global illumination is applied may be switched by the user.

Second Embodiment

The aforementioned embodiment has explained the rendering processes in the PC 100 and rendering server 200 when the PC 100 as a client device manages game progress. This embodiment will explain rendering processes in respective devices when game processing, game progress of which is managed by a rendering server 200, is executed.

<Game Processing>

Basic game processing executed by the rendering server 200 of the rendering system of this embodiment, which has the same arrangement as in the aforementioned first embodiment, will be described first. The following description will be given under the assumption that execution of the game processing is started by a server CPU 201, for example, when the rendering server 200 is started up, and this processing is repetitively executed for one frame of a game.

Since the game processing executed in the rendering server 200 of this embodiment is nearly the same as that executed in a PC 100 of the aforementioned first embodiment, a detailed description of the processing will not be given, and only differences will be explained.

In the game processing of the first embodiment, in response to an operation input made by the user to change the position and direction of the camera, which specify the game screen, the CPU 101 in the PC 100 changes and updates the rendering camera parameters indicating the position and direction of the camera. In this embodiment, the server CPU 201 in the rendering server 200 changes and updates the rendering camera parameters. For this reason, information indicating the operation input to change the position and direction of the camera, which is detected by the PC 100, is transferred to the rendering server 200 via a communication unit 107, and the server CPU 201 changes and updates the rendering camera parameters based on the information indicating the operation input.

After the rendering camera parameters are determined, the server CPU 201 transfers the rendering camera parameters to the PC 100 via a server communication unit 207. At this time, when the CPU 101 detects that the communication unit 107 receives the rendering camera parameters, it executes client-side rendering processing (to be described later). Also, after the rendering camera parameters are determined, the server CPU 201 executes the same server-side rendering processing as in the first embodiment using these parameters, thus completing the game processing related to one frame.

<Client-Side Rendering Processing>

Figure 7:
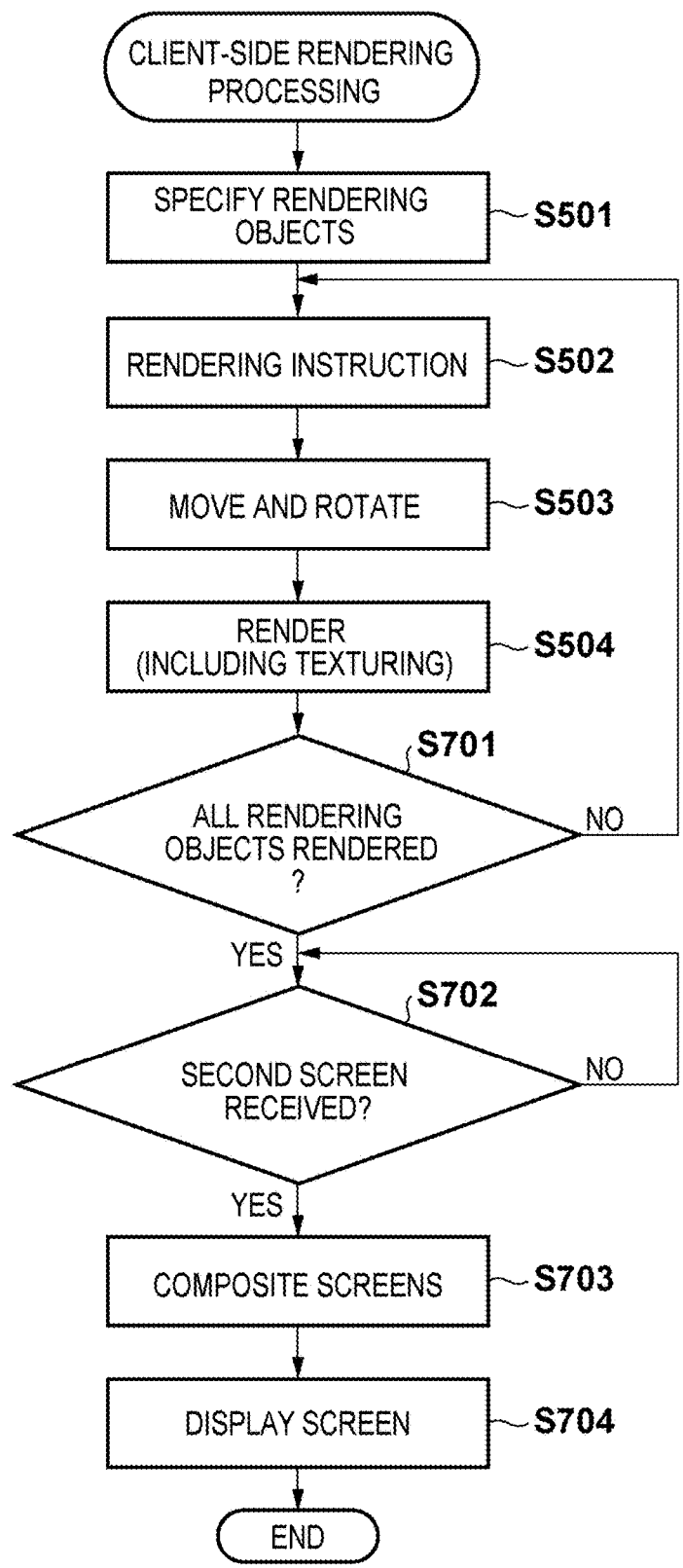
FIG. 7 is a flowchart exemplifying client-side rendering processing according to the second embodiment of the present invention.

The client-side rendering processing executed in the PC 100 of this embodiment will be practically described below with reference to the flowchart shown in FIG. 7. Note that the following description will be given under the assumption that this client-side rendering processing is started when the CPU 101 detects that the communication unit 107 receives the rendering camera parameters, as described above. In the client-side rendering processing of this embodiment, the same step numbers denote steps which execute the same processes as those in the aforementioned first embodiment, and a description thereof will not be repeated. Only characteristic processes of this embodiment will be described.

After the rendering object is rendered in step S504, the CPU 101 determines in step S701 whether or not rendering of all the rendering objects included in the rendering range by the GPU 104 on the VRAM 105 is complete. If the CPU 101 judges that rendering of all the rendering objects on the VRAM 105 is complete, the process advances to step S702; otherwise, the process returns to step S502.

The CPU 101 determines in step S702 whether or not the second screen, which is generated by applying the global illumination without applying the texturing processing related to the game screen, is received. More specifically, the CPU 101 determines whether or not the communication unit 107 receives the second screen from the rendering server 200 via a network 300. If the CPU 101 judges that the second screen is received, the process advances to step S703; otherwise, the process of this step is repeated.

In step S703, the CPU 101 generates, on, for example, a VRAM 105, a final game screen to be displayed on a display unit 108 by compositing the received second screen and the first screen. More specifically, the first and second screens are formed of, for example, images of R, G, and B components, and images of respective colors associated with the final game screen are generated by compositing pixels at identical pixel positions of the images of the respective colors.

In step S704, the CPU 101 transfers the final game screen generated in step S703 to the display unit 108, so as to display it on the display screen.

In this way, even when game progress management is executed on the server side like in a network game, the present invention can be applied to efficiently distribute rendering processes, and the client device can provide a high-quality game screen to which the global illumination is applied to the user.

Note that when the server manages game progress like in this embodiment, the following advantages can be provided. For example, when the server simultaneously provides a game screen to a plurality of client devices, the calculation load of the rendering processing on the server becomes heavy in, for example, a game content which requires quick responsiveness. That is, the number of client devices to which the server can provide a screen is limited depending on its rendering performance and required responsiveness. By contrast, when each client device is controlled to execute processing which can be executed by general rendering performance to share the rendering processes between the server and client device, a screen can be provided to more client devices. Also, in general, a game screen which is rendered without applying texture mapping has high compression efficiency, and can be sent with a smaller bandwidth via a network such as the Internet.

In the first and second embodiments, some predetermined processes of the rendering processing have been described as application processing of the global illumination which requires heavier calculation load and higher calculation performance than the texturing processing. However, the present invention is not limited to such specific embodiment. The present invention generates the same screen as that obtained when one device executes rendering processing by compositing a plurality of images related to one screen, which are generated by a plurality of devices as a result of executing shared rendering processing for one screen between these devices. That is, the present invention is applicable to a case in which a desired screen is obtained by compositing images obtained from a plurality of devices by simple processing as a result of sharing rendering processes related to one screen by a plurality of devices. For example, processing (second processing: for example, illuminating calculations (shading processing), superimposing of rendering objects which give effects, and so forth) for generating an image which can be additionally superimposed on a first screen on which rendering objects to which at least texturing processing (first processing) is applied are rendered can be shared and executed by a device different from the device which renders the first screen.

Note that the aforementioned embodiments have explained the case in which the rendering processing using basic illumination models is executed by the client device. Also, the present invention is applicable to rendering processing using a shader architecture as a popular rendering method for existing game consoles. The rendering processing using a basic shader architecture generally includes a vertex shader, geometry shader, and pixel shader. Of these shaders, the vertex shader and geometry shader, which are minimally required to render rendering objects that have undergone texture mapping may be assigned to the client device, and the pixel shader which applies effects including bump mapping and specular mapping may be assigned to the rendering server.

This embodiment has explained only the case in which the rendering processes are shared and executed by the two devices. However, the present invention is not limited to such specific embodiment. It could be easily understood that the present invention is applicable to a case in which one screen is generated by sharing the rendering processes to two or more devices. Note that in this case, the rendering processes are shared so that one final screen can be generated by simply compositing images as results of the rendering processes of the respective devices.

The present invention is preferably applied to a case in which rendering processing is executed by executing calculation processing every time one screen is generated like in the rendering processing for rendering a three-dimensional scene on a two-dimensional image, as described in the above embodiments. However, the present invention is not limited to such specific embodiment. For example, as for a still image, the rendering server may analyze the still image and may send a luminance correction filter as an image, and the client device may composite the still image and filter.

As described above, the rendering system of the present invention allows a plurality of devices to share and efficiently execute rendering processes related to one screen. More specifically, the rendering system allows the plurality of devices to share and execute the rendering processes of a screen to be displayed on a display device. One of the plurality of devices sends information required to determine rendered contents of the screen to be displayed to respective devices of the plurality of devices except for that one device. The one device generates a first screen by executing some processes including a first process of the rendering processing of the screen to be displayed in accordance with the information required to determine the rendered contents. On the other hand, upon reception of the information required to determine the rendered contents from the one device, each of the devices except for the one device generates a second screen by executing some processes, which do not include the first process but include a second process different from the first process, of the rendering processing of the screen to be displayed, in accordance with the received information, and sends the generated screen to the one device. Then, the one device receives the second screens respectively generated by the devices except for the one device, and generates the screen to be displayed by compositing the first screen and the second screens.

In this manner, other devices can share and execute rendering processes related to one screen, and effects of the shared rendering processes can be easily applied by composition processing. Hence, for example, an enriched game screen can be provided independently of the rendering performance of the client device.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A rendering system for allowing a plurality of devices to share and execute rendering processing of a screen to be displayed on a display, one device of the plurality of devices comprising:
   a transmitter which is able to send information required to determine rendered contents of the screen to be displayed to respective devices except for the one device of the plurality of devices;
   a first rendering processor which is able to generate a first screen by executing some processes including a first process of the rendering processing of the screen to be displayed according to the information required to determine the rendered contents;
   a screen receiver which is able to receive second screens which are generated by the respective devices except for the one device and correspond to the rendered contents; and
   a compositor which is able to generate the screen to be displayed by compositing the first screen generated by said first rendering processor and the second screens received by said screen receiver, and
   each of the devices, except for the one device, comprising:
   a receiver which is able to receive the information required to determine the rendered contents from the one device;
   a second rendering processor which is able to generate the second screen by executing some processes, which do not include the first process but include a second process different from the first process, of the rendering processing of the screen to be displayed according to the information required to determine the rendered contents, which said receiver received; and
   a screen transmitter which is able to send the second screen generated by said second rendering processor to the one device, wherein the first screen and the second screen are generated by rendering a same rendering object, and representation of the same rendering object is different between the first screen and the second screen.

2. The system according to claim 1, wherein the rendering processing of the screen to be displayed is processing for rendering a three-dimensional scene as a two-dimensional image, and the first screen and the second screen include two-dimensional images obtained by executing different processes in association with the same three-dimensional scene.

3. The system according to claim 1, wherein the second process is a process having a heavier calculation load than the first process.

4. The system according to claim 1, wherein the first process is a process for applying a texture to a rendering object included in the screen to be displayed.

5. The system according to claim 1, wherein the second process is a process including an illuminating calculation for a rendering object included in the screen to be displayed.

6. The system according to claim 1, wherein the information required to determine the rendered contents is information indicating a position and a direction of a camera required to define the screen to be displayed.

7. The system according to claim 1, wherein the first screen and the second screen are formed of images of R components, G components, and B components, and
   said compositor generates images of R components, G components, and B components of the screen to be displayed by compositing pixel values of the images for respective color components.

8. The system according to claim 1, wherein when said screen receiver fails to receive the second screen, said compositor outputs the first screen as the screen to be displayed.

9. A rendering system, which allows a first device and a second device to share and execute rendering processing of a screen to be displayed on a display,
   the first device comprising:
   a receiver which is able to receive information required to determine rendered contents of the screen to be displayed from the second device;
   a first rendering processor which is able to generate a first screen by executing some processes including a first process of the rendering processing of the screen to be displayed according to the information required to determine the rendered contents, which said receiver received;
   a screen receiver which is able to receive a second screen which is generated by the second device and corresponds to the rendered contents; and
   a compositor which is able to generate the screen to be displayed by compositing the first screen generated by said first rendering processor and the second screen received by said screen receiver, and
   the second device comprising:
   a transmitter which is able to send information required to determine the rendered contents to the first device;
   a second rendering processor which is able to generate the second screen by executing some processes, which do not include the first process but include a second process different from the first process, of the rendering processing of the screen to be displayed according to the information required to determine the rendered contents; and
   a screen transmitter which is able to send the second screen generated by said second rendering processor to the first device, wherein the first screen and the second screen are generated by rendering a same rendering object, and representation of the same rendering object is different between the first screen and the second screen.

10. A rendering server, which handles some processes including a first process of rendering processing of a screen to be displayed on a display connected to a client device which renders a first screen, said server comprising:
    a rendering processor which is able to generate a second screen to be provided by executing some processes, which do not include the first process but include a second process different from the first process, of the rendering processing of the screen to be displayed in accordance with information required to determine rendered contents of the screen to be displayed; and
    a transmitter which is able to send the second screen to be provided generated by said rendering processor to the client device, wherein:
    the first screen and the second screen are generated by rendering a same rendering object, and representation of the same rendering object is different between the first screen and the second screen, and
    the screen to be displayed is generated on the client device by compositing the first screen and the second screen.

11. The server according to claim 10, wherein said rendering processor generates the screen to be provided without applying texturing processing to a rendering object included in the screen to be displayed.

12. The server according to claim 10, wherein the information required to determine the rendered contents is information indicating a position and a direction of a camera required to define the screen to be displayed.

13. A non-transitory computer-readable recording medium recording a program for controlling a computer to function as respective processor of a rendering server of claim 10.

14. A control method of a rendering server, which handles some processes including a first process of rendering processing of a screen to be displayed on a display connected to a client device which renders a first screen, the method comprising:
generating a second screen to be provided by executing some processes, which do not include the first process but include a second process different from the first process, of the rendering processing of the screen to be displayed in accordance with information required to determine rendered contents of the screen to be displayed;
sending the second screen to be provided generated in the generating of the screen, to the client device;
generating the first screen and the second screen by rendering a same rendering object, wherein representation of the same rendering object is different between the first screen and the second screen, and
generating the screen to be displayed on the client device by compositing the first screen and the second screen.

15. A non-transitory computer-readable recording medium recording a program for controlling a computer to which a display is connected to function as:
a transmitter which is able to send information required to determine rendered contents of a screen to be displayed on the display to a rendering server;
a rendering processor which is able to generate a first screen by executing some processes different from some processes including a first process of rendering processing of the screen to be displayed in accordance with the information required to determine the rendered contents;
a screen receiver which is able to receive a second screen, which is generated by the rendering server and corresponds to the rendered contents, the rendering server being configured to generate the second screen by executing some processes, which do not include the first process but include a second process different from the first process, of the rendering processing of the screen to be displayed according to the information required to determine the rendered contents, which said screen receiver received;
a compositor which is able to generate the screen to be displayed by compositing the first screen generated by said rendering processor and the second screen received by said screen receiver; and
a processor which is able to display the screen to be displayed generated by said compositor on the display, wherein the first screen and the second screen are generated by rendering a same rendering object, and representation of the same rendering object is different between the first screen and the second screen.

* * * * *